US005327644A

United States Patent [19]

Tanaka et al.

[11] Patent Number: 5,327,644

[45] Date of Patent: Jul. 12, 1994

[54] HARNESS MAKING APPARATUS

[75] Inventors: Hiromi Tanaka, Machida; Shigeru Naka, Kawasaki, both of Japan

[73] Assignee: The Whitaker Corporation, Wilmington, Del.

[21] Appl. No.: 60,788

[22] Filed: May 12, 1993

[30] Foreign Application Priority Data

May 29, 1992 [JP] Japan .................................. 4-138774

[51] Int. Cl.$^5$ ........................ H01R 43/04; B23P 23/00

[52] U.S. Cl. ...................................... 29/861; 29/33 M; 29/569.1; 29/564.4; 29/857

[58] Field of Search .................... 29/564.4, 857, 33 M, 29/861, 862, 863, 564.1

[56] References Cited

U.S. PATENT DOCUMENTS 4,114,014 9/1978 Shogo et al. .................. 29/564.4 X
4,136,440 1/1979 Brandewie et al. ........... 29/564.4 X
4,145,807 3/1979 Beetz et al. ........................... 29/857
4,360,962 11/1982 Suzuki et al. ...................... 29/564.4
4,862,587 9/1989 Nakata et al. .................. 29/564.4 X
4,932,110 6/1990 Tanaka ........................... 29/564.4 X
5,058,260 10/1991 Gloe et al. ........................ 29/564.4
5,224,251 7/1993 Cameron et al. ............. 29/564.4 X

FOREIGN PATENT DOCUMENTS 61-96611 5/1986 Japan .
4-14708 1/1992 Japan .

*Primary Examiner*—Carl J. Arbes
*Attorney, Agent, or Firm*—Adrian J. LaRue

[57] ABSTRACT

A harness making apparatus comprises a length measurement section to measure the length of a plurality of wires fed from a wire feeder and an insulation displacing section for insulation displacing the wires to a connector fed from a connector feeder. Additionally, the harness making apparatus is provided with a fusing section disposed adjacent to the insulation displacing section for fusing and intercoupling a plurality of wires in such a manner that adjacent wires substantially abut against one another.

7 Claims, 9 Drawing Sheets

Fig. 5
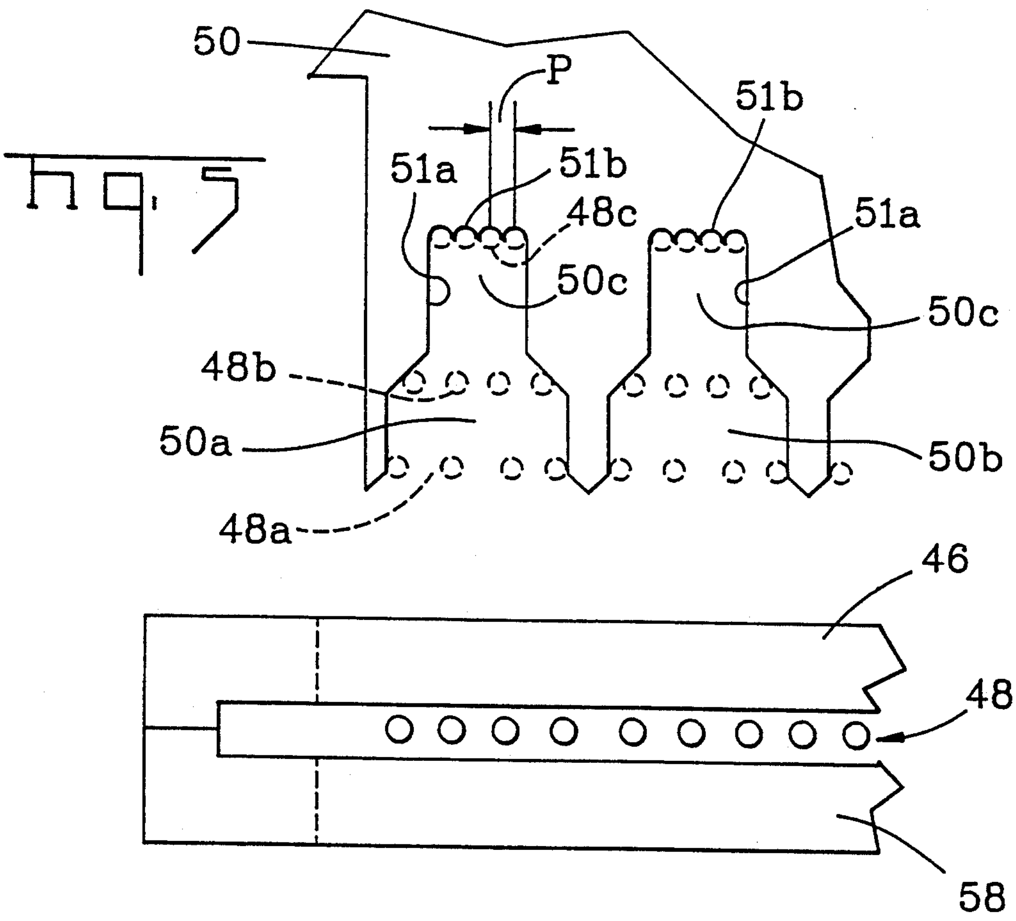
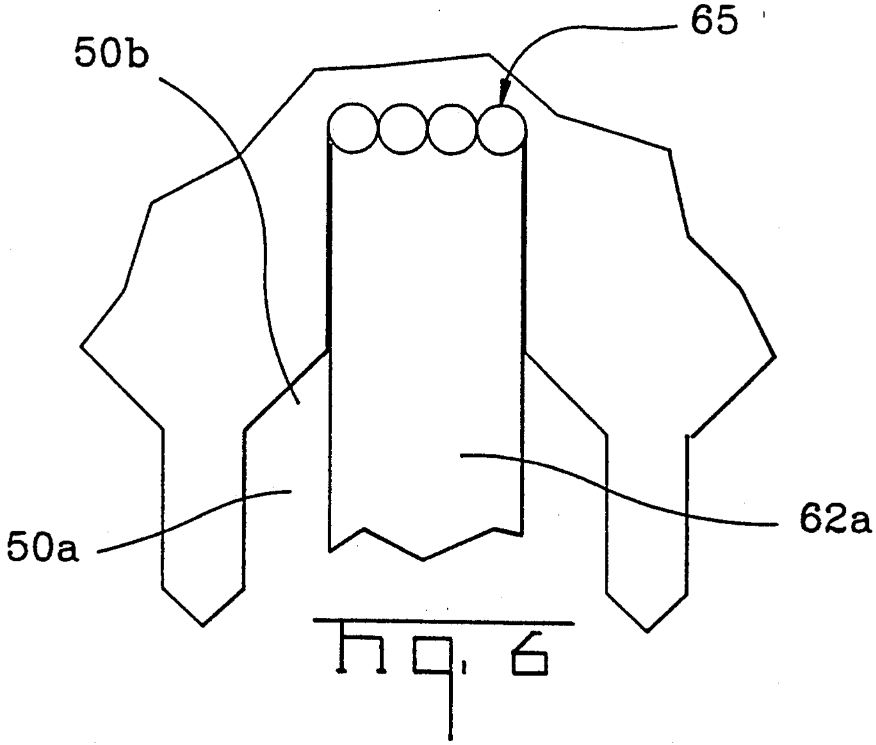
Fig. 6

HARNESS MAKING APPARATUS

FIELD OF THE INVENTION

The present invention relates to a harness making apparatus for making a harness by insulation displacing a plurality of electrical wires to a connector.

BACKGROUND OF THE INVENTION

It is known to bind or bond electrical wires and not to separate them from one another because a plurality of separated electrical wires extending between a pair of connectors in a harness make the harness difficult to handle due to entangling of the wires and the connectors of one harness or a plurality of harnesses.

The simplest technique to avoid the above problem is to bind a plurality of wires by manually taping around the wires of the assembled harness at desired locations. It is effective to bind at any desired location but a disadvantage is the manual operation which is not suited for quantity production. Also, automatic taping requires an additional taping machine separated from the wire harness making machine, thereby increasing cost, space and harness making steps.

In view of the above, it is proposed to use fused or intercoupled wires for making a harness. Such prior art technologies can be classified into two groups; one for using partly fused wires as disclosed in Japanese Patent Publication No. 96611/86 and the other for using completely fused wires as set forth in Japanese Patent No. 14708/92.

In case of using wires partly fused in advance, the pitch of the fused wires must be converted to be equal to the pitch of contacts of the connector before the wires are insulation displaced to the connector. It is typical to insulation displace at the portions of the wires where not fused to one another. However, a slitter to separate the fused wires is required so as to insulation displace at any location, especially when the harness length is preferably changed.

It is also true to use a slitter and/or a pitch converter to convert the wire pitch to the insulation displacing pitch when fully fused wires are to be used. Another disadvantage of using such fused wires is the wires are less flexible which is inconvenient in handling.

As described hereinbefore, in case of making a harness using partly or fully fused wires, there is a need for pitch conversion from the wire pitch to the insulation displacing pitch which often requires a slitting operation of the wires at the fused portion.

In case of using wires already fused in part or along their entire length, there arises the need for a device to fuse and bind the wires in advance separated from the harness making machine and also for a pitch converter and a slitter, thereby making the harness making apparatus complicated. Additionally, slitting the cut ends of a plurality of wires to convert the wire pitch into the insulation displacing pitch accompanies spreading the wire ends, thereby shortening the outer wires as compared with the central wires in the longitudinal direction. This results in improper insulation displacing the wires to a connector.

In view of the above problems, it is an object of the present invention to provide a harness making apparatus capable of continuously performing the steps of insulation displacing a plurality of wires to a connector and of fusing to couple the wires at desired locations.

SUMMARY OF THE INVENTION

For achieving the above object, the harness making apparatus according to the present invention is to make a harness or harnesses by connecting a plurality of wires separated by a constant pitch from one another to a connector and features length measurement section to measure the length of a plurality of wires fed from wire feeders; an insulation displacing section for insulation displacing the plurality of wires to a connector supplied from a connector feeder; and a fusing section disposed adjacent to the insulation displacing section for mutually fusing to intercouple or bind the wires.

In the harness making apparatus according to the present invention, leading ends of a plurality of wires from a wire feeder at the insulation displacing pitch are fed to the insulation displacing section for insulation displacing or terminating the leading ends to a first connector at the insulation displacing section. Subsequently, the connector is fed downstream along a wire path and the length of the plurality of wires fed from the wire feeder is measured by the length measurement section. The wires at the desired length are converted from the insulation displacing pitch to the wire pitch at the fused location of the wires to obtain the wires fused and intercoupled to a substantially abutting or adjacent relationship. Then, the wires are continued to be fed from the wire feeder to measure the length of the plurality of wires. The wires are fused at a plurality of fused locations, if necessary, for insulation displacing the wires to a connector at a desired location of the wires in the insulation displacing section.

In the harness making apparatus according to the present invention as described above, the wires are fused at the wire pitch from the insulation displacing pitch at the fusing section adjacent to the insulation displacing section. As a result, the proper insulation displacing can be performed with the wire ends aligned properly, and the resulting harness is fused at a plurality of desired locations.

BRIEF DESCRIPTION OF THE DRAWINGS

The present invention will be described in detail hereunder by way of example with reference to the accompanying drawings illustrating a preferred embodiment of the harness making apparatus.

FIG. 5 is the fusing section in partly magnified form illustrating the way of bringing a plurality of wires adjacent to one another.

FIG. 6 is a view of a plurality of wires fused to one another.

DETAILED DESCRIPTION OF THE INVENTION

Figure 1:
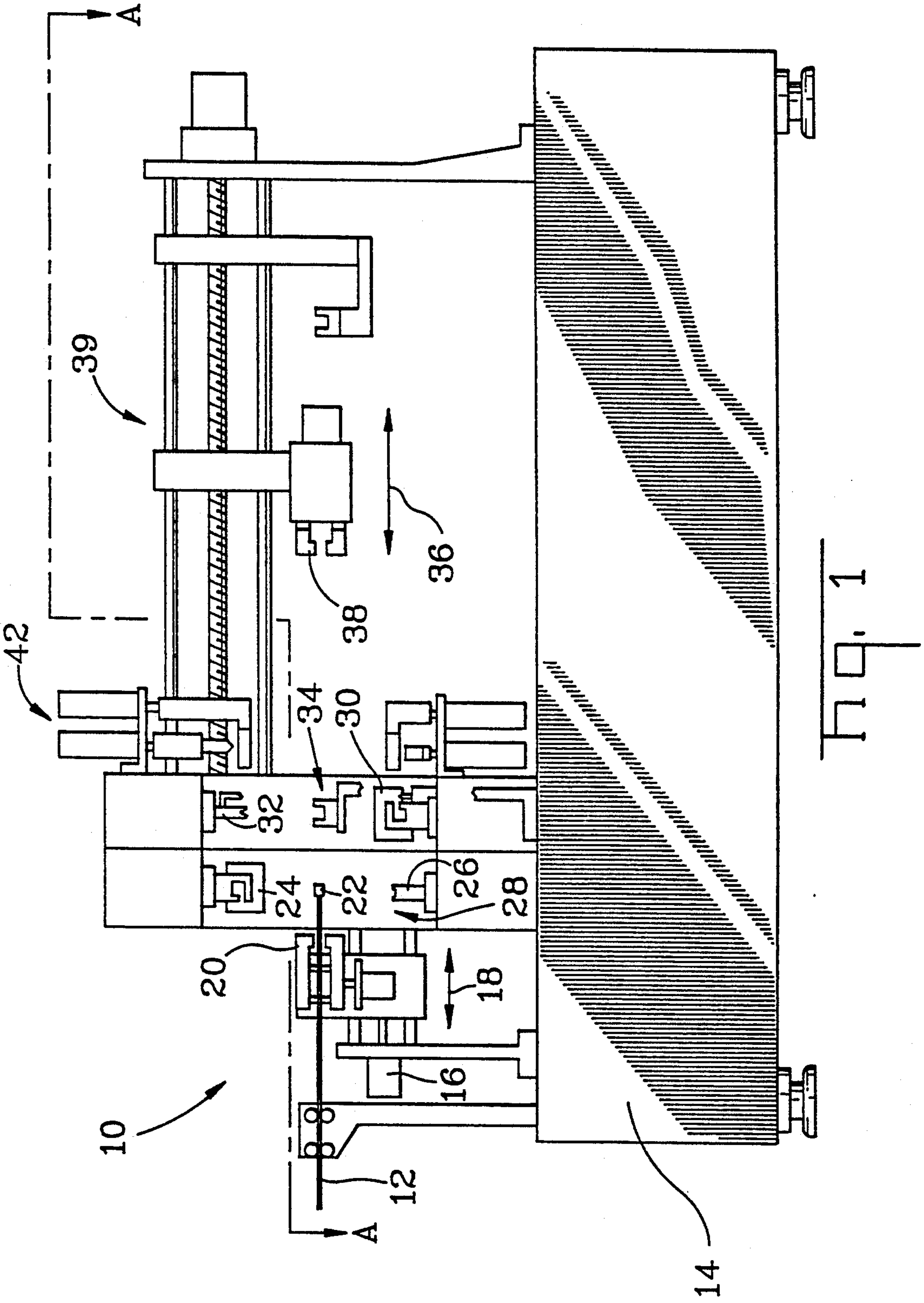
FIG. 1 is a front view of one embodiment of the harness making apparatus according to the present invention.
Figure 2:
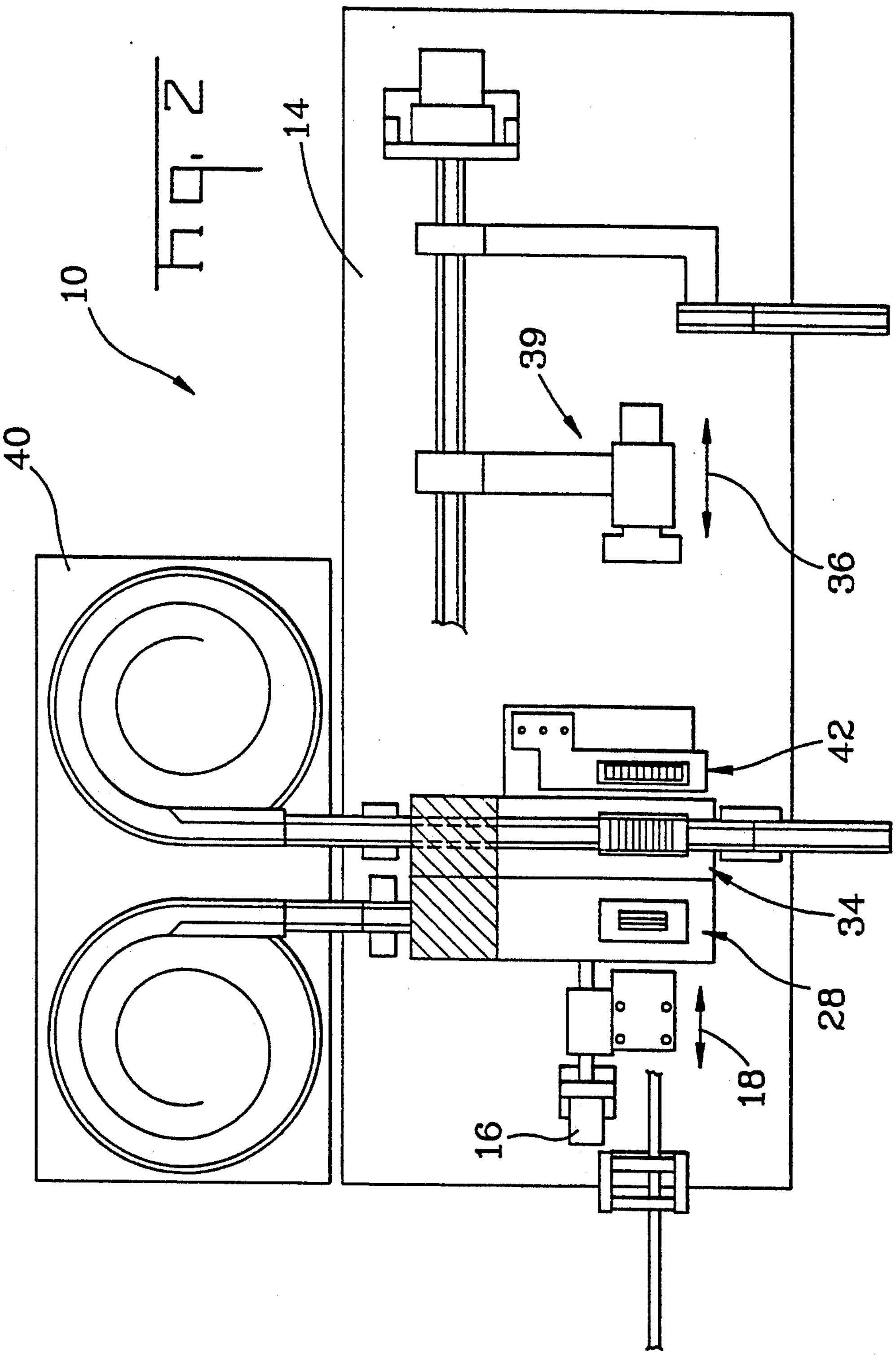
FIG. 2 is a cross sectional view along the line A—A in FIG. 1.

The harness making apparatus 10 is provided with a wire feeder (not shown in FIG. 1) for feeding a plurality of wires 12. Provided on a base 14 are an insulation displacing section 28 including a wire clamp 20 to be driven by a wire clamp motor 16 to move the clamped wires in the direction of an arrow 18, a comb 24 and a stuffer 26 for insulation displacing ends of wires to a connector 22, and insulation displacing section 34 including a comb 30 and a stuffer 32 for insulation displacing the other ends of the wires to another connector, and a length measurement section 39 to clamp the connector 22 to move in the direction of an arrow 36 and a measure clamp 38 to measure the length of the wires. Also, provided at the side of the insulation displacing sections 28, 34 is a part feeder 40 (see FIG. 2) to supply respective connectors. Additionally, along the wire feed path in the insulation displacing section 34, there is provided a fusing section 42 adjacent to the insulation displacing section 34 for fusing to couple the fed wires in a substantially side-by-side manner. The fusing section 42 utilizes ultrasonic waves to fuse and couple a plurality of wires to one another, which is described in detail hereinafter by reference to FIGS. 3 and 4.

Figure 3:
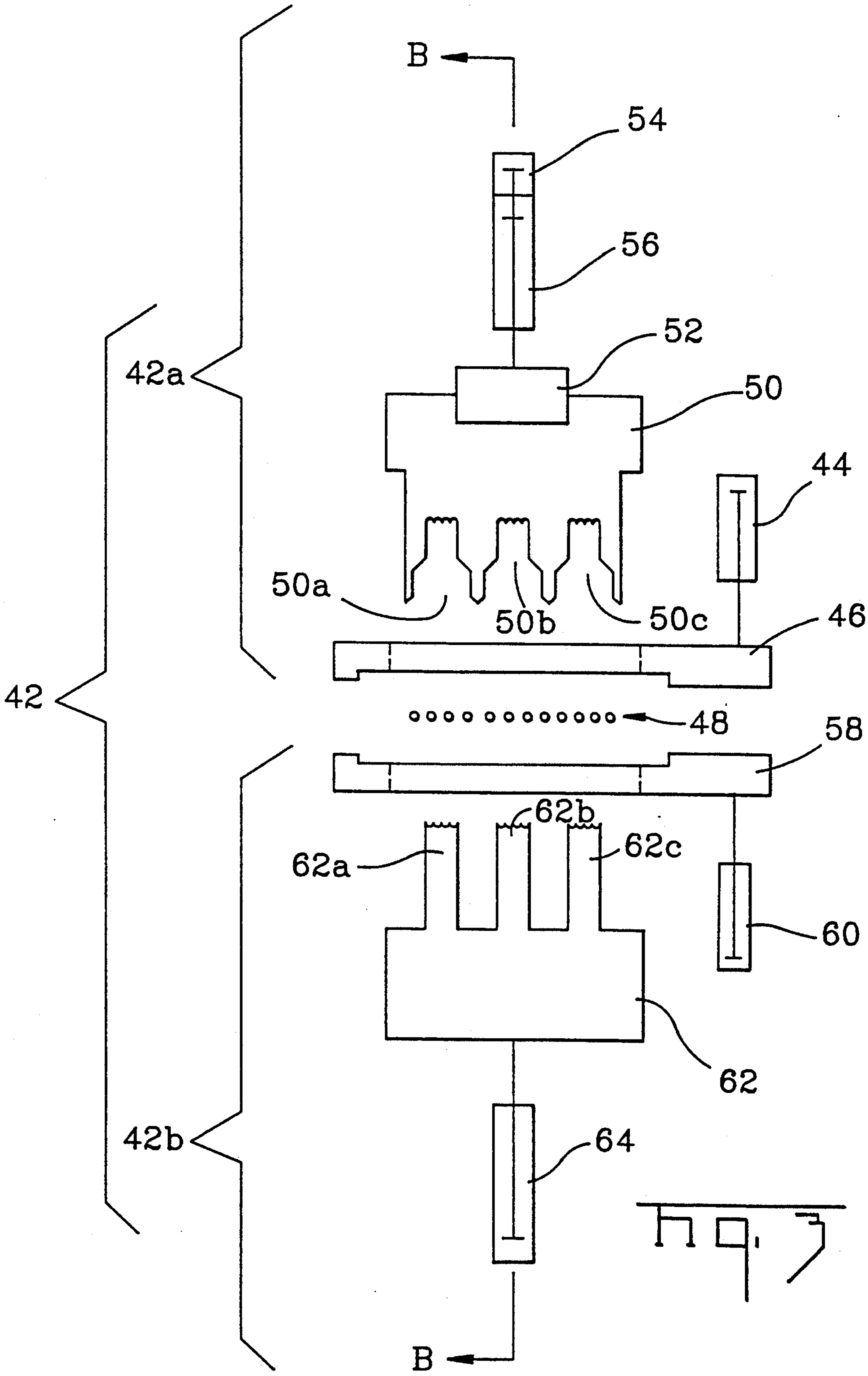
FIG. 3 is a view of the fusing section seen from the insulation displacing section in FIG. 1.
Figure 4:
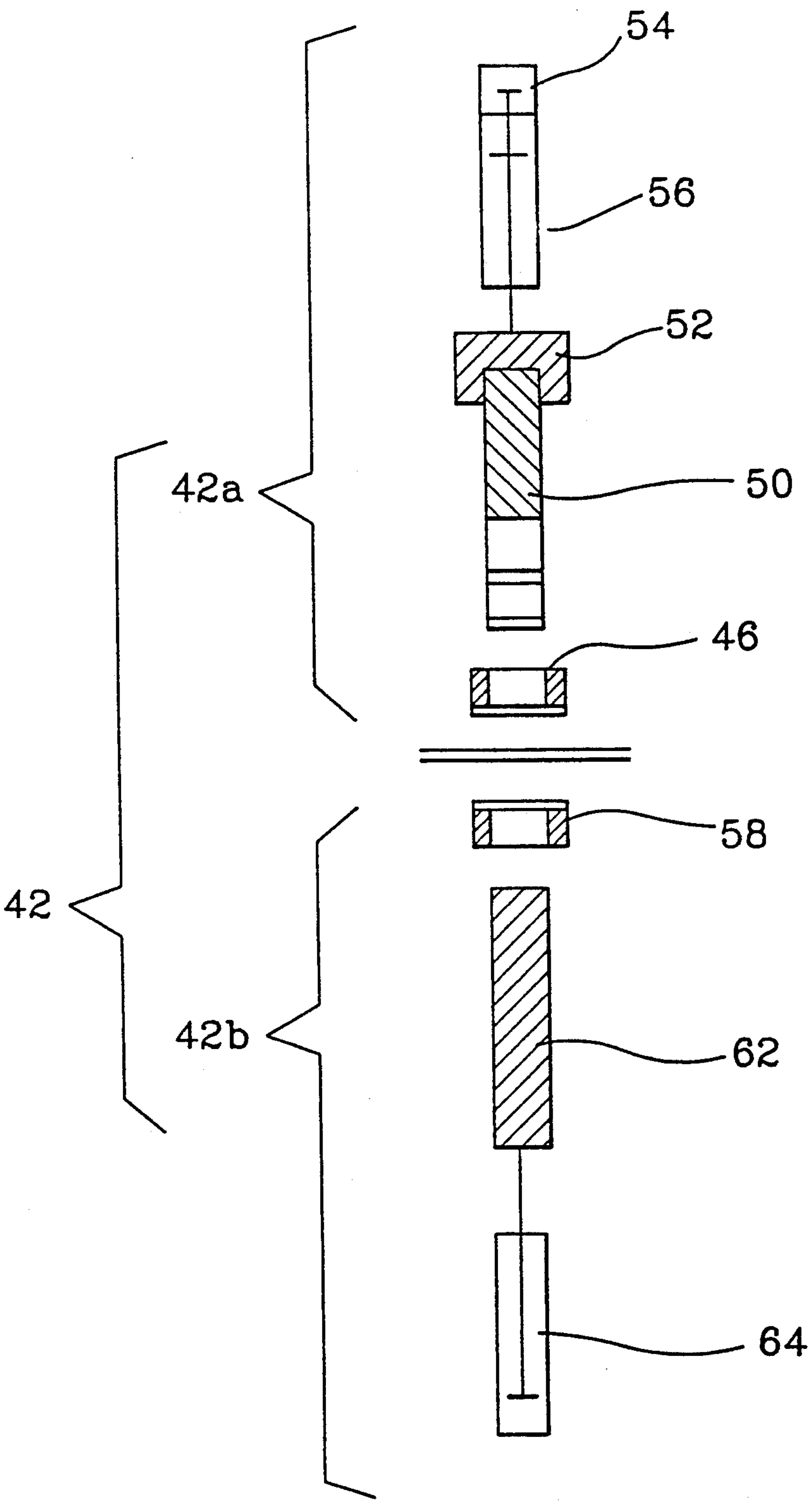
FIG. 4 is a cross sectional view along the line B—B in FIG. 3.

Illustrated in FIG. 3 is the fusing section 42 seen from the side of the insulation displacing section 34 while FIG. 4 is a cross sectional view along the line B—B in FIG. 3.

The fusing section 42 is divided into two portions; an upper portion 42*a* and a lower portion 42*b*. The upper portion 42*a* is provided with an upper wire guide 46 to be driven by an upper wire guide cylinder 44, a horn 50 to collect a plurality of wires 48 to be fused into groups of a predetermined number of wires, a vibrator 52 for oscillating the horn 50, a cylinder 54 for semi-clamping, and a horn up-down cylinder 56 for moving the horn 50 up and down. The horn 50 is provided with wire collecting sections 50*a*, 50*b*, 50*c* for separating the wires 48 into a plurality of groups depending on the number of contacts of each connector. The particular embodiment shown in FIG. 3 includes three wire collecting sections. It is to be noted that the horn and the wire collecting sections may be separated. The lower portion 42*b* is provided with a lower wire guide 58 to guide a plurality of wires in cooperation with the upper wire guide 46, a lower wire guide cylinder 60 to drive the lower wire guide 58, a jig 62 having receiving sections 62*a*, 62*b*, 62*c* equal in number to the wire collecting sections for fusing the wires 48 in cooperation with the horn 50, and a jig up-down cylinder 64 to drive the jig 62 up and down.

Referring now to FIGS. 5 and 6, illustrated are steps of fusing a plurality of wires fed to the fusing section 42 to a side-by-side manner. FIG. 5 illustrates in partly magnified form the way of bringing a plurality of wires to next to one another while FIG. 6 illustrates the plurality of wires fused to one another.

A plurality of wires 48 of the insulation displacing pitch guided by the upper wire guide 46 and the lower wire guide 58 are converted into the wire pitch condition 48*c* from the insulation displacing pitch condition 48*a* by way of an intermediate condition 48*b* as the horn 50 goes down as illustrated in FIG. 5. (It is to be noted that the upper and lower wire guides 46, 48 are omitted in the conditions 48*a*, 48*b*, 48*c* of the wires 48 to avoid complication of the drawing.)

The horn 50 has a sharp tapered portion 51*a* opening downwardly above the wire collection sections 50*a*, 50*b*, 50*c*. The wires 48 moving inside of the wire collection sections 50*a*, 50*b*, 50*c* substantially abut against one another at the low end of the tapered portion 51*a*. When the wires 48 move relatively upwardly along the tapered portion 51*a*, the wires 48 are pushed against one another to a smaller pitch than the wire pitch by the force of the tapered portion 51*a*. A plurality of arcuate portions 51*b* of a pitch P smaller than the wire pitch are formed on the upper end of each wire collection section 50*a*, 50*b*, 50*c* with the radius of curvature substantially equal to or slightly smaller than the outer radius of the wires 48. The wires 48 under the condition 48*c* are forced to narrow the pitch of the wires 48 by the tapered portion 51*a* and the arcuate portions 51*b*, thereby allowing the outer jackets of the adjacent wires 48 to contact at relatively wider areas so that fused strength is increased after ultrasonic wave fusing. The wires 48, however, return to substantially the initial wire pitch when the wires 48 are removed from the horn 50 after fusing to remove any force from the tapered portion 51*a* and the like. The wires 48 can be fused with minimum cross sectional deformation because the wires 48 do not need reduced wire jacket diameter to form room for fusing unlike the conventional thermal fusing. As illustrated in FIG. 6, the wires 65 converted to the wire pitch by the wire collection section 50*a* are fused with one another by, for example, ultrasonic waves while fixed to the receiving portion 62*a*.

Now, harness making steps using the harness making apparatus 10 will be described by reference to FIGS. 7 through 17.

Figure 7:
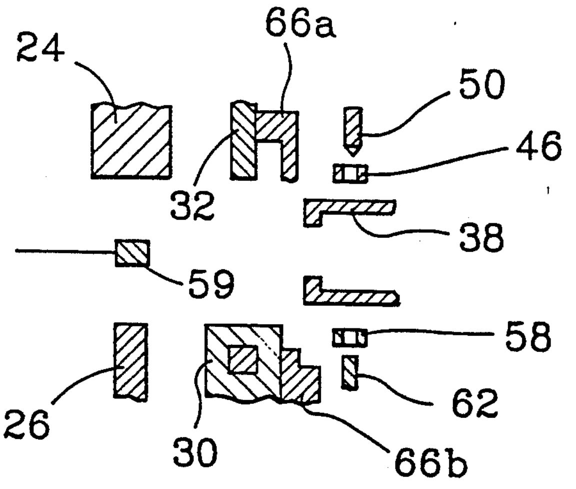
FIG. 7 shows a step of making a harness wherein a front end connector is insulation displaced to leading ends of wires.
Figure 8:
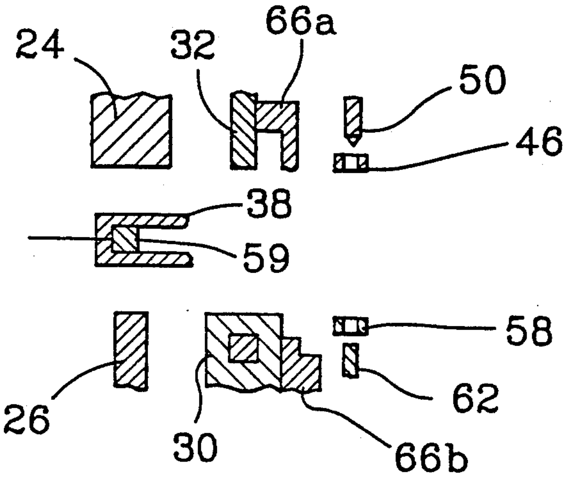
FIG. 8 shows a step of making a harness wherein a measure clamp clamps the leading ends of the wires.
Figure 9:
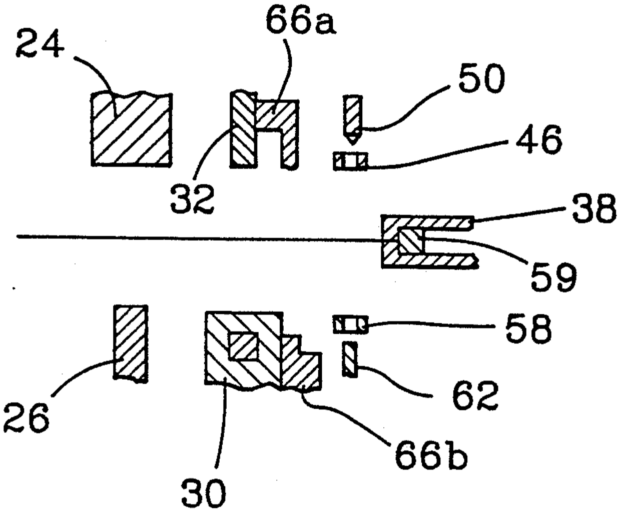
FIG. 9 shows a step of making a harness wherein the measure clamp moves downstream along the wire path for measuring the wire length.
Figure 10:
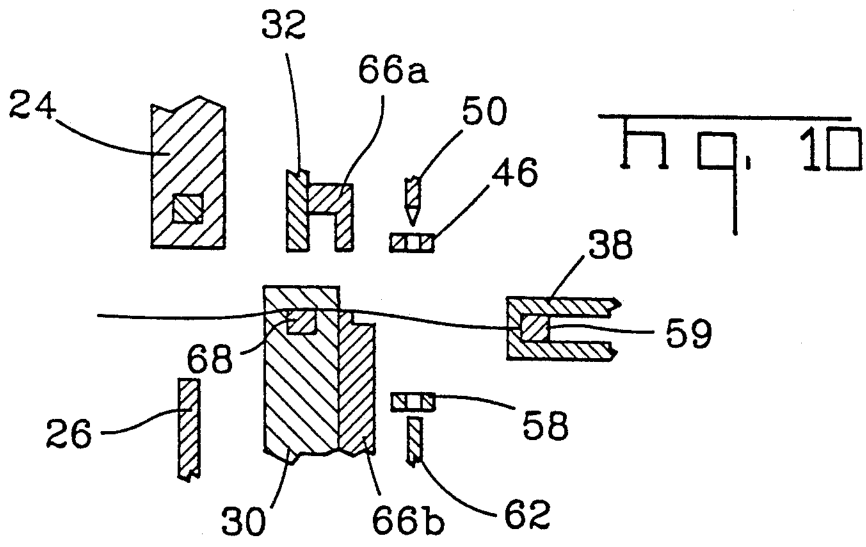
FIG. 10 shows a step of making a harness wherein a comb is raised to maintain the insulation displacing pitch of the wires.
Figure 11:
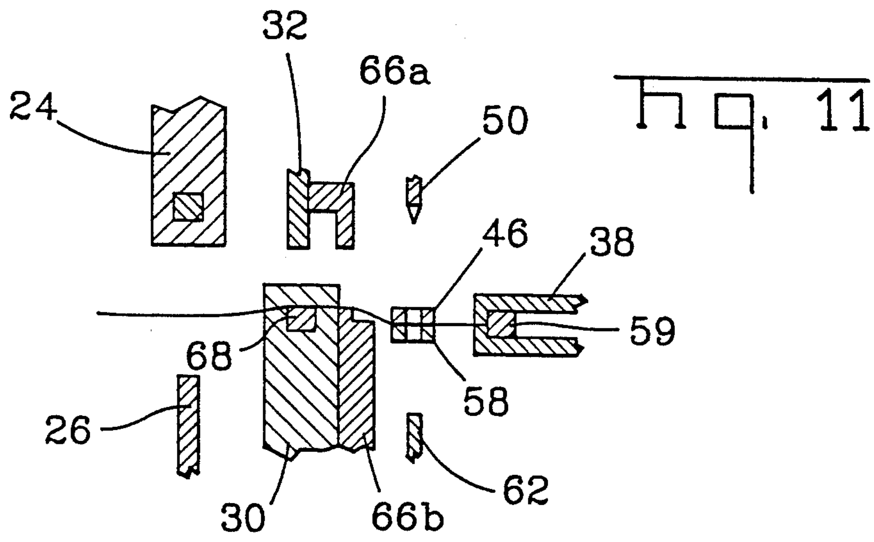
FIG. 11 slows a step of making a harness wherein the wires are held between upper and lower wire guides.
Figure 12:
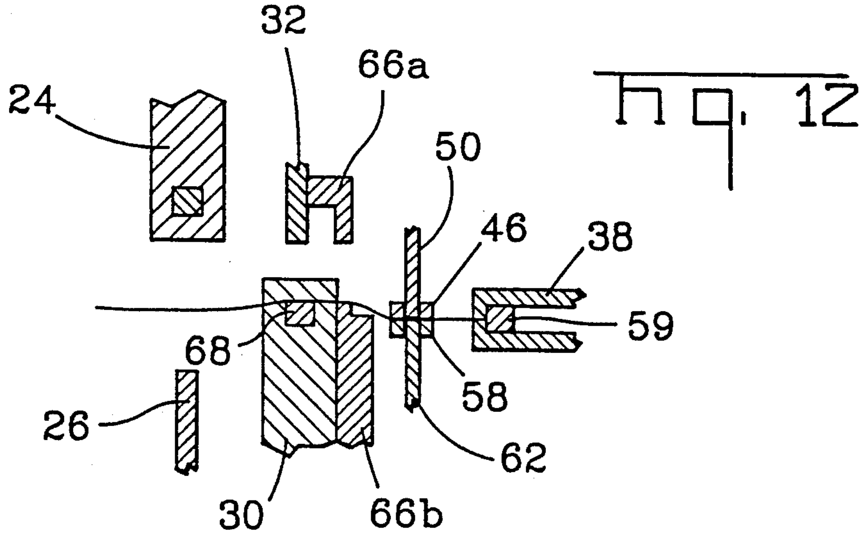
FIG. 12 shows a step of making a harness wherein a horn is pushed down for pitch conversion of the wires to the wire pitch depending on each connector and for mutually fusing the wires between a receiving jig and the horn.
Figure 13:
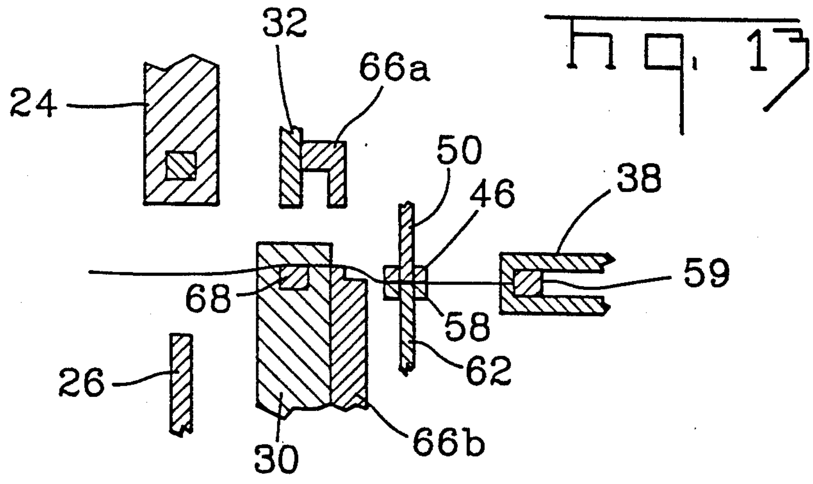
FIG. 13 shows a step of making a harness wherein the horn and the receiving jig are in their semi-clamped condition and the measure clamp pulls the wires to the next fusing location while measuring the length.
Figure 14:
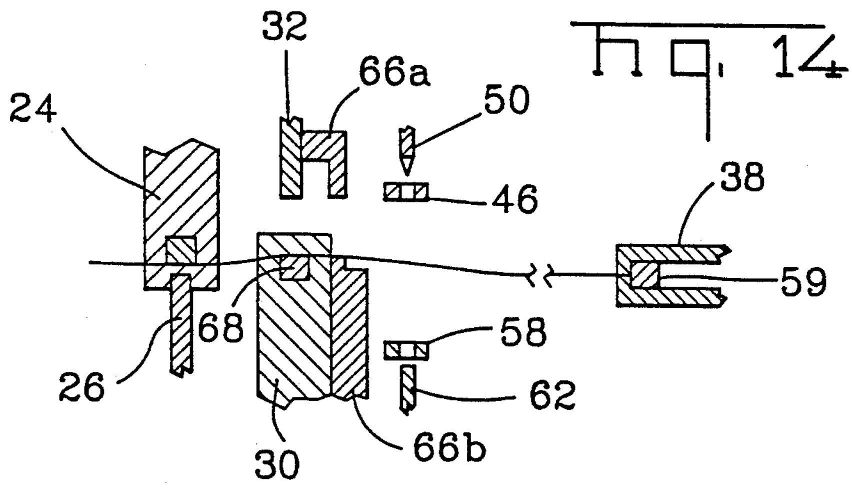
FIG. 14 shows, step of making a harness wherein a comb goes down, the horn goes up, and the receiving jig goes down to open the upper and lower wire guides.
Figure 15:
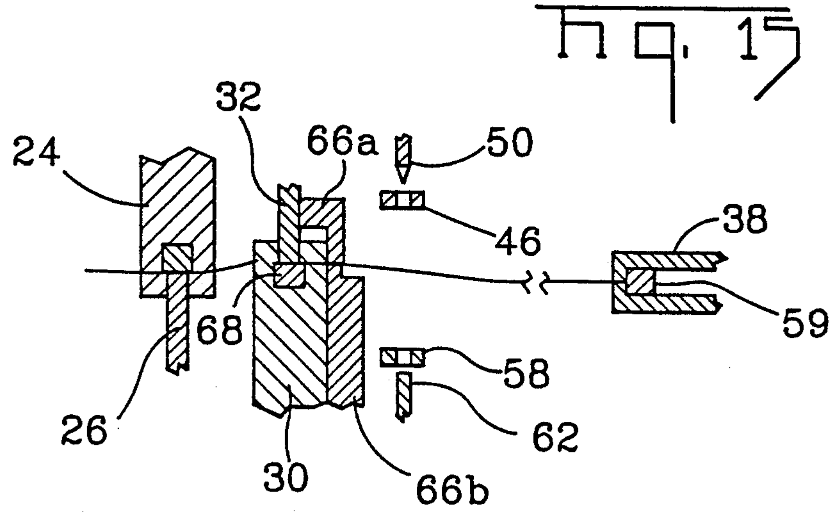
FIG. 15 shows a step of making a harness wherein trailing ends of the wires are insulation displaced to a trailing end connector.
Figure 16:
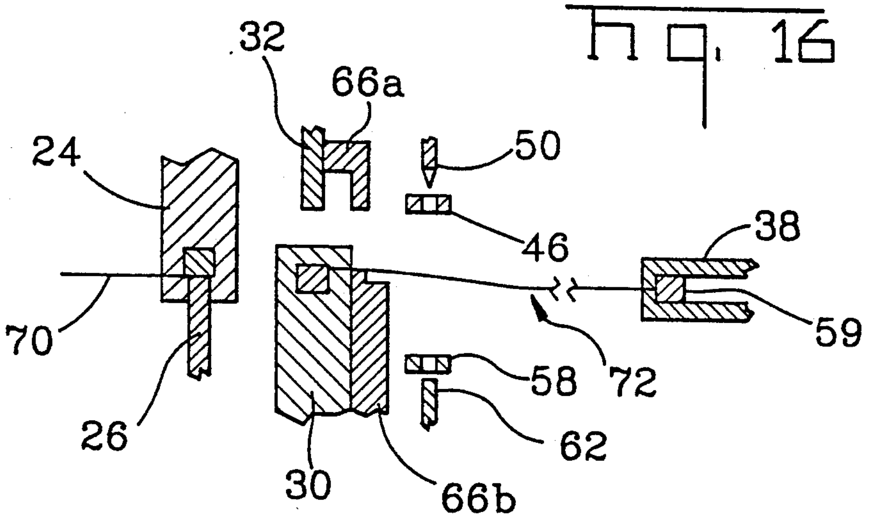
FIG. 16 shows a step of making a harness wherein the wire clamp pulled the wires for the subsequent harness to a front end insulation displacing location downstream along the wire path.
Figure 17:
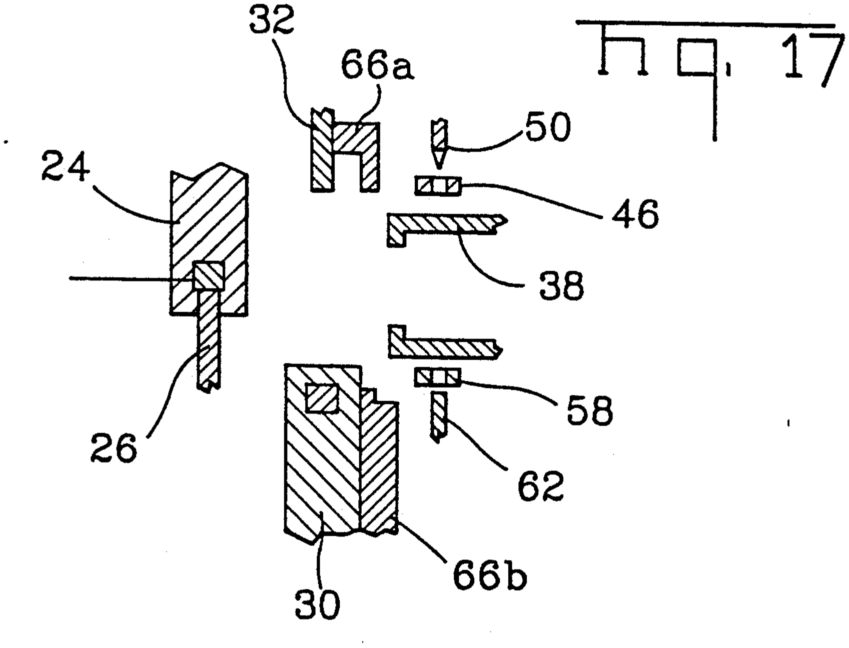
FIG. 17 shows a step of making a harness wherein one complete harness making cycle has been completed.

Illustrated in FIG. 7 is the front end connector 59 insulation displaced to the leading ends of wires, in which the comb 24 and the stuffer 26, the comb 30 and the stuffer 32, the measure clamp 38, the upper and lower wire guides 46, 58 are in their open conditions. Then, the measure clamp 38 moves between the comb 24 and the stuffer 26 to clamp the leading ends of the wires as illustrated in FIG. 8. Subsequently, the measure clamp 38 moves toward downstream of the wire path and for measuring the wire length and also for fusing the wires at desired locations as illustrated in FIG. 9. As shown in FIG. 10, the comb 30 moves up to maintain the wires in the insulation displacing pitch. Then, the wires are held between the upper and lower wire guides 46, 58 as shown in FIG. 11. As illustrated in FIG. 12, the horn 50 goes down to convert the plurality of wires to the wire pitch corresponding to the number of contacts in each connector. The receiving jig 62 is raised to hold the plurality of wires in the wire pitch between the horn 50. Subsequently, the horn 50 is oscillated via the ultrasonic waves to fuse the wires with one another. After stopping oscillation of the horn 50, the horn 50 and the receiving jig 62 are brought into a semi-clamped condition and the measure clamp 38 pulls the wires 48 to the next fusing location while measuring the wires 48 as illustrated in FIG. 13. When the next fusing location reaches the fusing section, the horn 50 and the receiving jig 62 clamp the wires 48 therebetween to fuse the wires 48 again at the new fusing location by oscillating the horn 50. It will be appreciated that the above operation can be repeated as many times as required to fuse the wires 48 at additional fusing locations. On completing the fusing operation, the comb 24 goes down to insulation displacing a connector to the trailing ends of the wires 48 as illustrated in FIG. 14. Then, the horn 50 goes up and the receiving jig 62 goes down to open the upper and lower wire guides 46, 58. As shown in FIG. 15, the stuffer 32 is pushed down for insulation displacing the wires 48 to the trailing end connector 68 while the wires 48 are clamped between the upper and lower wire hold-down members 66*a*, 66*b*. Simultaneously, the wires are cut at the trailing ends. In the next step, the stuffer 32 as well as the upper wire hold-down member 66*a* go up while the lower wire hold-down member 66*b* goes down as illustrated in FIG. 16. The wire clamp 20 (see FIG. 1) moves upstream along the wire path so that the leading ends of the wires 70 are located above the insulation displacing section 28. An assembled harness 72 is discharged by a harness discharging mechanism not shown in the drawing. Finally, as illustrated in FIG. 17, a connector is insulation displaced at the leading ends of the wires to return the initial condition in FIG. 7 by moving down the stuffer 26 and raising the comb 24, thereby completing a harness making cycle.

In the harness making apparatus of the particular embodiment as described above, a plurality of wires are fused by converting from the insulation displacing pitch to the wire pitch by the wire fusing section disposed adjacent to the insulation displacing section, thereby allowing such wires to be bound or fused to one another in succession for insulation displacing of the wires to a connector without using previously fused wires unlike the conventional technique. Additionally, the use of the fusing section built in the harness making machine eliminates a separate fusing apparatus, thereby achieving a compact harness making system.

In the harness making apparatus of the particular embodiment, ultrasonic energy is utilized as a source of energy to fuse and intercouple the jackets of adjacent wires. However, it will be understood that any alternative energy source may be used for fusing the jackets. Alternatively, the adjacent jackets of the wires may be fused by ultrasonic waves or other heat source by way of a separate plastic sheet rather than mutually fusing adjacent wire jackets.

Fusing the wire jackets using ultrasonic energy can be performed without reducing the cross section area of the wires, thereby maintaining the required thickness of the wire insulator to comply with UL or other standards. Additionally, a heater or other heat source is effectively avoided for completely automatic operation even at night. If it is required to replace the fusing section due to changes in harness specification, it is easy to replace the fusing section because of no heat storage.

Although the fusing section is positioned at the downstream of the insulation displacing section along the wire path because the length measurement section pulls the wire ends to the downstream from the insulation displacing section in the particular embodiment, the fusing section may be positioned between two insulation displacing sections in such a harness making machine where the length measurement section is placed between the wire feeder and the insulation displacing section as disclosed in, for example, Japanese Patent Publication No. 30009/85.

The present invention features positioning the fusing section adjacent to the insulation displacing section for pitch conversion from the insulation displacing pitch to the wire pitch and fusing of the wires enables making a harness with the wires automatically fused at a plurality of desired locations.

We claim:

1. A harness making apparatus for making a harness by connecting to a connector a plurality of electrical wires fed thereto with a predetermined distance from one another, comprising:

a length measurement section for measuring the length of the plurality of electrical wires fed from electrical wire feeders;

an insulation displacing section for insulation displacing the plurality of electrical wires to the connector fed from a connector feeder; and a fusing section disposed adjacent to said insulation displacing section for fusingly coupling said electrical wires to one another by substantially contacting or positioning the electrical wires adjacent to one another.

2. A harness making apparatus as claimed in claim 1, wherein said fusing section includes an upper section and a lower section, said upper section comprises an upper wire guide and a horn, said horn having wire-collecting sections for separating the wires into groups of wires, said lower section comprises a lower wire guide to guide the wires in cooperation with the upper wire guide and a jig having wire-receiving sections for fusing the wires in cooperation with said horn.

3. A harness making apparatus as claimed in claim 2, wherein the wires collected in the wire-collecting sections are fused via ultrasonic wave fusings.

4. A harness making apparatus as claimed in claim 1, and further comprising another insulation displacing section for insulation displacing the ends of the measured length of the plurality of electrical wires to another connector fed from said connector feeder.

5. A method of making an electrical harness comprising the steps of:

terminating leading ends of a plurality of electrical wires to electrical contacts of an electrical connector;

clamping onto the electrical wires adjacent the connector;

measuring a length of the electrical wires; and securing the wires together at a location spaced from the connector.

6. A method of making an electrical harness as claimed in claim 5, wherein the step of securing the wires together includes the use of ultrasonic waves to fuse the wires together.

7. A method of making an electrical harness as claimed in claim 5, further including the step of terminating the trailing ends of the electrical wires to electrical contacts of another electrical connector.

* * * * *